US010793281B2

(12) United States Patent
Vondrell et al.

(10) Patent No.: US 10,793,281 B2
(45) Date of Patent: Oct. 6, 2020

(54) PROPULSION SYSTEM FOR AN AIRCRAFT

(71) Applicant: General Electric Company, Schenectady, NY (US)

(72) Inventors: Randy M. Vondrell, Cincinnati, OH (US); Glenn David Crabtree, Oregonia, OH (US)

(73) Assignee: General Electric Company, Schenectady, NY (US)

( * ) Notice: Subject to any disclaimer, the term of this patent is extended or adjusted under 35 U.S.C. 154(b) by 840 days.

(21) Appl. No.: 15/429,979

(22) Filed: Feb. 10, 2017

(65) Prior Publication Data
US 2018/0230844 A1 Aug. 16, 2018

(51) Int. Cl.
| | |
|---|---|
| *B64D 27/24* | (2006.01) |
| *B64D 31/12* | (2006.01) |
| *B64D 27/18* | (2006.01) |
| *F01D 15/10* | (2006.01) |
| *H02K 7/116* | (2006.01) |
| *H02K 7/18* | (2006.01) |
| *H02P 25/30* | (2006.01) |
| *B64D 27/02* | (2006.01) |

(52) U.S. Cl.
CPC ............. *B64D 27/24* (2013.01); *B64D 27/18* (2013.01); *B64D 31/12* (2013.01); *F01D 15/10* (2013.01); *H02K 7/116* (2013.01); *H02K 7/1823* (2013.01); *H02P 25/30* (2013.01); *B64D 2027/026* (2013.01); *B64D 2221/00* (2013.01); *F05D 2220/323* (2013.01); *Y02T 50/64* (2013.01)

(58) Field of Classification Search
CPC .......................... B64D 27/24; B64D 2027/026
See application file for complete search history.

(56) References Cited

U.S. PATENT DOCUMENTS

| | | | |
|---|---|---|---|
| 2,812,912 | A | 11/1957 | Stevens et al. |
| 3,041,465 | A | 6/1962 | Ayre |
| 3,286,470 | A | 11/1966 | Gerlaugh |
| 3,312,448 | A | 4/1967 | Hull, Jr. et al. |
| 3,844,110 | A | 10/1974 | Widlansky et al. |
| 4,089,493 | A | 5/1978 | Paulson |
| 4,270,408 | A | 6/1981 | Wagner |

(Continued)

FOREIGN PATENT DOCUMENTS

| | | |
|---|---|---|
| CA | 2870506 A1 | 5/2015 |
| EP | 3 048 042 A1 | 7/2016 |

(Continued)

OTHER PUBLICATIONS

Extended European Search Report and Opinion issued in connection with corresponding EP Application No. 18156001.2 dated Jun. 20, 2018.

(Continued)

*Primary Examiner* — Nicholas McFall

(74) *Attorney, Agent, or Firm* — Dority & Manning, P.A.

(57) ABSTRACT

A propulsion system for an aircraft includes a turbomachine having a first turbine, a primary fan mechanically driven by the first turbine of the turbomachine, and an electric generator mechanically driven by the first turbine of the turbomachine. The propulsion system also includes an electric fan assembly, the electric generator electrically connected to the electric fan assembly for powering the electric fan assembly.

20 Claims, 7 Drawing Sheets

(56) References Cited

U.S. PATENT DOCUMENTS

| | | |
|---|---|---|
| 4,370,560 A | 1/1983 | Faulkner et al. |
| 4,605,185 A | 8/1986 | Reyes |
| 4,913,380 A | 4/1990 | Verdaman et al. |
| 5,174,109 A | 12/1992 | Lampe |
| 5,799,484 A | 9/1998 | Nims |
| 5,927,644 A | 7/1999 | Ellis et al. |
| 6,105,697 A | 8/2000 | Weaver |
| 6,169,332 B1 | 1/2001 | Taylor et al. |
| 6,545,373 B1 | 4/2003 | Andres et al. |
| 6,834,831 B2 | 12/2004 | Daggett |
| 6,976,655 B2 | 12/2005 | Thompson |
| 6,992,403 B1 | 1/2006 | Raad |
| 7,251,942 B2 | 8/2007 | Dittmar et al. |
| 7,267,300 B2 | 9/2007 | Heath et al. |
| 7,285,871 B2 | 10/2007 | Derouineau |
| 7,334,392 B2 | 2/2008 | Moniz et al. |
| 7,380,749 B2 | 6/2008 | Fucke et al. |
| 7,387,189 B2 | 6/2008 | James et al. |
| 7,417,337 B1 | 8/2008 | Suttie |
| 7,493,754 B2 | 2/2009 | Moniz et al. |
| 7,495,354 B2 | 2/2009 | Herrmann |
| 7,514,810 B2 | 4/2009 | Kern et al. |
| 7,528,499 B2 | 5/2009 | Suttie |
| 7,555,893 B2 | 7/2009 | Okai et al. |
| 7,665,689 B2 | 2/2010 | McComb |
| 7,677,502 B2 | 3/2010 | Lawson et al. |
| 7,752,834 B2 | 7/2010 | Addis |
| 7,806,363 B2 | 10/2010 | Udall et al. |
| 7,818,969 B1 | 10/2010 | Hotto |
| 7,819,358 B2 | 10/2010 | Belleville |
| 7,905,449 B2 | 3/2011 | Cazals et al. |
| 7,926,259 B2 | 4/2011 | Orlando et al. |
| 7,952,244 B2 | 5/2011 | Colin |
| 7,958,727 B2 | 6/2011 | Arnold |
| 7,970,497 B2 | 6/2011 | Derouineau et al. |
| 7,976,273 B2 | 7/2011 | Suciu et al. |
| 8,016,228 B2 | 9/2011 | Fucke et al. |
| 8,033,094 B2 | 10/2011 | Suciu et al. |
| 8,039,983 B2 | 10/2011 | Cote et al. |
| 8,099,944 B2 | 1/2012 | Foster et al. |
| 8,109,073 B2 | 2/2012 | Foster et al. |
| 8,128,019 B2 | 3/2012 | Annati et al. |
| 8,141,360 B1 | 3/2012 | Huber |
| 8,162,254 B2 | 4/2012 | Roche |
| 8,193,761 B1 | 6/2012 | Singh |
| 8,220,739 B2 | 7/2012 | Cazals |
| 8,226,040 B2 | 7/2012 | Neto |
| 8,291,716 B2 | 10/2012 | Foster et al. |
| 8,317,126 B2 | 11/2012 | Harris et al. |
| 8,432,048 B1 | 4/2013 | Paulino |
| 8,469,306 B2 | 6/2013 | Kuhn, Jr. |
| 8,489,246 B2 | 7/2013 | Dooley |
| 8,492,920 B2 | 7/2013 | Huang et al. |
| 8,522,522 B2 | 9/2013 | Poisson |
| 8,549,833 B2 | 10/2013 | Hyde et al. |
| 8,552,575 B2 | 10/2013 | Teets et al. |
| 8,561,413 B2 | 10/2013 | Taneja |
| 8,568,938 B2 | 10/2013 | Gao et al. |
| 8,596,036 B2 | 12/2013 | Hyde et al. |
| 8,622,342 B2 | 1/2014 | Filho |
| 8,631,657 B2 | 1/2014 | Hagen et al. |
| 8,636,241 B2 | 1/2014 | Lugg et al. |
| 8,640,439 B2 | 2/2014 | Hoffjann et al. |
| 8,657,227 B1 | 2/2014 | Bayliss et al. |
| 8,672,263 B2 | 3/2014 | Stolte |
| 8,684,304 B2 | 4/2014 | Burns et al. |
| 8,692,489 B2 | 4/2014 | Maalioune |
| 8,723,349 B2 | 5/2014 | Huang et al. |
| 8,723,385 B2 | 5/2014 | Jia et al. |
| 8,742,605 B1 | 6/2014 | Wilhide et al. |
| 8,836,160 B1 | 9/2014 | Paterson et al. |
| 8,857,191 B2 | 10/2014 | Hyde et al. |
| 8,890,343 B2 | 11/2014 | Bulin et al. |
| 8,925,660 B2 | 1/2015 | Bowdich et al. |
| 8,928,166 B2 | 1/2015 | Seger et al. |
| 8,939,399 B2 | 1/2015 | Kouros et al. |
| 8,950,703 B2 | 2/2015 | Bayliss et al. |
| 8,957,539 B1 | 2/2015 | Ralston |
| 8,997,493 B2 | 4/2015 | Brust et al. |
| 8,998,580 B2 | 4/2015 | Quiroz-Hernandez |
| 9,004,849 B2 | 4/2015 | Munsell et al. |
| 9,038,398 B2 | 5/2015 | Suciu et al. |
| 9,045,996 B2 | 6/2015 | Anghel et al. |
| 9,059,440 B2 | 6/2015 | Hotto |
| 9,068,562 B1 | 6/2015 | Budica et al. |
| 9,073,632 B2 | 7/2015 | Baumann |
| 9,143,023 B1 | 9/2015 | Uskert |
| 9,190,892 B2 | 11/2015 | Anthony |
| 9,193,311 B2 | 11/2015 | Siegel et al. |
| 9,318,625 B2 | 4/2016 | Gatzke |
| 9,487,303 B2 | 11/2016 | Siegel et al. |
| 9,764,848 B1 | 9/2017 | Vondrell et al. |
| 10,000,293 B2 | 6/2018 | Hamel et al. |
| 2006/0037325 A1 | 2/2006 | Peters et al. |
| 2008/0056892 A1 | 3/2008 | Barton et al. |
| 2009/0179424 A1 | 7/2009 | Yaron |
| 2010/0038473 A1 | 2/2010 | Schneider et al. |
| 2011/0016882 A1 | 1/2011 | Woelke et al. |
| 2012/0119020 A1 | 5/2012 | Burns et al. |
| 2012/0153076 A1 | 6/2012 | Burns et al. |
| 2012/0209456 A1 | 8/2012 | Harmon et al. |
| 2012/0214605 A1 | 8/2012 | Snook et al. |
| 2013/0032215 A1 | 2/2013 | Streifinger |
| 2013/0036730 A1 | 2/2013 | Bruno et al. |
| 2013/0052005 A1 | 2/2013 | Cloft |
| 2013/0062885 A1 | 3/2013 | Taneja |
| 2013/0088019 A1 | 4/2013 | Huang et al. |
| 2013/0099065 A1 | 4/2013 | Stuhlberger |
| 2013/0139515 A1 | 6/2013 | Schlak |
| 2013/0154359 A1 | 6/2013 | Huang et al. |
| 2013/0184958 A1 | 7/2013 | Dyrla et al. |
| 2013/0227950 A1 | 9/2013 | Anderson et al. |
| 2013/0251525 A1 | 9/2013 | Saiz |
| 2013/0306024 A1 | 11/2013 | Rolt |
| 2013/0310994 A1 | 11/2013 | Schroeter |
| 2013/0327014 A1 | 12/2013 | Moulebhar |
| 2014/0010652 A1 | 1/2014 | Suntharalingam et al. |
| 2014/0060995 A1 | 3/2014 | Anderson et al. |
| 2014/0084677 A1 | 3/2014 | Haillot |
| 2014/0151495 A1 | 6/2014 | Kuhn, Jr. |
| 2014/0245748 A1 | 9/2014 | Anghel et al. |
| 2014/0250861 A1 | 9/2014 | Eames |
| 2014/0271114 A1 | 9/2014 | Phillips et al. |
| 2014/0283519 A1 | 9/2014 | Mariotto et al. |
| 2014/0290208 A1 | 10/2014 | Rechain et al. |
| 2014/0338352 A1 | 11/2014 | Edwards et al. |
| 2014/0339371 A1 | 11/2014 | Yates et al. |
| 2014/0345281 A1 | 11/2014 | Galbraith |
| 2014/0346283 A1 | 11/2014 | Salyer |
| 2014/0360206 A1 | 12/2014 | Bradbrook |
| 2014/0367510 A1 | 12/2014 | Viala et al. |
| 2014/0367525 A1 | 12/2014 | Salyer |
| 2014/0369810 A1 | 12/2014 | Binks et al. |
| 2015/0005990 A1 | 1/2015 | Burns et al. |
| 2015/0013306 A1 | 1/2015 | Shelley |
| 2015/0014479 A1 | 1/2015 | Bayliss et al. |
| 2015/0028594 A1 | 1/2015 | Mariotto |
| 2015/0084558 A1 | 3/2015 | Benson et al. |
| 2015/0084561 A1 | 3/2015 | Benson et al. |
| 2015/0084565 A1 | 3/2015 | Le Peuvedic |
| 2015/0089921 A1 | 4/2015 | Rideau et al. |
| 2015/0104310 A1 | 4/2015 | Griffin |
| 2015/0113996 A1 | 4/2015 | Cai et al. |
| 2015/0115108 A1 | 4/2015 | Benson et al. |
| 2015/0148993 A1 | 5/2015 | Anton et al. |
| 2015/0151844 A1 | 6/2015 | Anton et al. |
| 2015/0151847 A1 | 6/2015 | Krug et al. |
| 2015/0159552 A1 | 6/2015 | Rodriguez et al. |
| 2015/0183522 A1 | 7/2015 | Ouellette |
| 2015/0380999 A1 | 12/2015 | Joshi et al. |
| 2016/0061053 A1 | 3/2016 | Thomassin |
| 2016/0084104 A1 | 3/2016 | Sheridan et al. |

(56) References Cited

U.S. PATENT DOCUMENTS

| | | | |
|---|---|---|---|
| 2016/0181641 A1 | 6/2016 | Hoffjann et al. | |
| 2016/0304211 A1 | 10/2016 | Swann | |
| 2016/0340051 A1 | 11/2016 | Edwards et al. | |
| 2016/0355272 A1 | 12/2016 | Moxon | |
| 2016/0376918 A1* | 12/2016 | Swann | F01D 21/003 60/772 |
| 2018/0044028 A1* | 2/2018 | Takami | B64D 27/24 |

FOREIGN PATENT DOCUMENTS

| | | |
|---|---|---|
| GB | 2489311 A | 9/2012 |
| JP | 2006205755 A | 8/2006 |
| JP | 2016135671 A | 7/2016 |
| JP | 2016159692 A | 9/2016 |
| JP | 6435358 B2 | 12/2018 |
| WO | WO2010/020199 A1 | 2/2010 |
| WO | WO2014/072615 A1 | 5/2014 |
| WO | WO2014/123740 A1 | 8/2014 |

OTHER PUBLICATIONS http://aviationweek.com/awin/boeing-researches-alternative-propulsion-and-fuel-options, Aviation Week & Space Technology, Jun. 4, 2012.

Bradley et al., "Subsonic Ultra Green Aircraft Research, Phase II: N+4 Advanced Concept Development," NASA/CR-2012-217556, May 2012.

Simon Schramm, Damping of Torsional Interaction Effects in Power Systems, 2010.

Secunde et al., "Integrated engine-generator concept for aircraft electric secondary power", Aircraft propulsion and power, NASA Technical Reports Server (NTRS), pp. 12, Jun. 1, 1972.

Hyun Dae Kim et al., "Distributed Turboelectric Propulsion for Hybrid Wing Body Aircraft", Auxiliary systems, NASA Technical Reports Server (NTRS), Conference: London, pp. 22, Jan. 1, 2008.

Office Action issued in connection with corresponding CA Application No. 2,993,724 dated Dec. 11, 2018.

Machine Translated Japanese Office Action Corresponding to Application No. 2018011066 on May 15, 2019.

\* cited by examiner

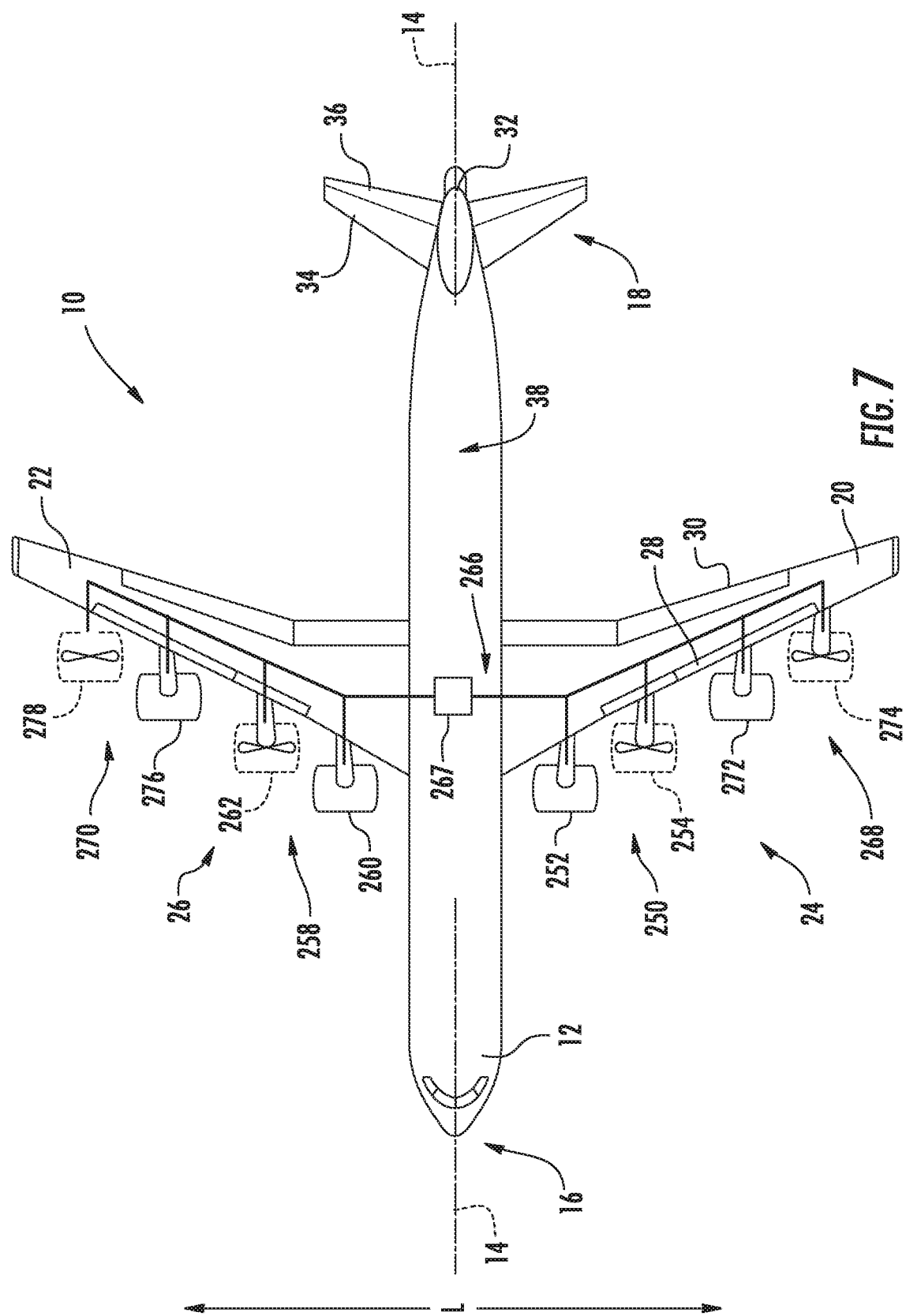

PROPULSION SYSTEM FOR AN AIRCRAFT

FIELD

The present subject matter relates generally to a propulsion system for an aircraft, and an aircraft including the same.

BACKGROUND

A conventional aircraft generally includes a fuselage, a pair of wings, and a propulsion system that provides thrust. The propulsion system may include at least two aircraft engines, such as turbofan jet engines. Each turbofan jet engine may be mounted to a respective one of the wings of the aircraft, such as in a suspended position beneath the wing.

For smaller aircraft, the two aircraft engines may be relatively small, low thrust generating aircraft engines. However, as is generally understood, the relatively small aircraft engines may not be as efficient as relatively large aircraft engines, given that the aircraft engines are not entirely scalable. Accordingly, a propulsion system for a small passenger aircraft capable of achieving efficiencies close to relatively large aircraft engines would be useful.

BRIEF DESCRIPTION

Aspects and advantages of the invention will be set forth in part in the following description, or may be obvious from the description, or may be learned through practice of the invention.

In one exemplary embodiment of the present disclosure, a propulsion system for an aircraft is provided. The propulsion system includes a turbomachine having a first turbine, a primary fan mechanically driven by the first turbine of the turbomachine, and an electric generator mechanically driven by the first turbine of the turbomachine. The propulsion system also includes an electric fan assembly, the electric generator electrically connected to the electric fan assembly for powering the electric fan assembly.

In certain exemplary embodiments the electric fan assembly includes a plurality of electric fans, wherein the electric generator is electrically connected to each of the plurality of electric fans for powering each of the plurality of electric fans. For example, in certain embodiments the plurality of electric fans includes at least three electric fans.

In certain exemplary embodiments the primary fan defines a fan diameter and includes a number of fan blades, wherein the electric fan assembly includes an electric fan defining a fan diameter and including a number of fan blades, and wherein at least one of the fan diameter or the number of fan blades of the primary fan is different than the fan diameter or number of fan blades of the electric fan of the electric fan assembly.

In certain exemplary embodiments the turbomachine and the primary fan are configured as part of a turbofan engine.

In certain exemplary embodiments the electric fan assembly includes a ducted electric fan.

In certain exemplary embodiments the electric fan assembly includes an un-ducted electric fan.

In another exemplary embodiment of the present disclosure, an aircraft is provided. The aircraft includes a first propulsion system including a first turbomachine, a first primary fan, a first electric generator, and a first electric fan assembly. The first turbomachine is drivingly connected to the first primary fan and the first electric generator, and the first electric generator is electrically coupled to the first electric fan assembly for driving the first electric fan assembly. The aircraft also includes a second propulsion system including a second turbomachine, a second primary fan, a second electric generator, and a second electric fan assembly. The second turbomachine is drivingly connected to the second primary fan and the second electric generator, and the second electric generator is electrically coupled to the second electric fan assembly for driving the second electric fan assembly. The first propulsion system is in electrical communication with the second propulsion system.

In certain exemplary embodiments the aircraft further includes an electric power bus, wherein the first propulsion system is in electrical communication with the second propulsion system through the electric power bus.

In certain exemplary embodiments the first electric fan assembly includes a plurality of electric fans, wherein the second electric fan assembly also includes a plurality of electric fans.

In certain exemplary embodiments the aircraft additionally includes a wing assembly including a first wing and a second wing, wherein the first propulsion system is mounted to the first wing, and wherein the second propulsion system is mounted to the second wing.

In certain exemplary embodiments the aircraft additionally a third propulsion system including a third turbomachine, a third primary fan, a third electric generator, and a third electric fan assembly. With such an embodiment, the third turbomachine is drivingly connected to the third primary fan and the third electric generator, and the third electric generator is electrically coupled to the third electric fan assembly for driving the third electric fan assembly. Also with such an embodiment, the aircraft further includes a fourth propulsion system including a fourth turbomachine, a fourth primary fan, a fourth electric generator, and a fourth electric fan assembly. With such an embodiment, the fourth turbomachine is drivingly connected to the fourth primary fan and the fourth electric generator, and the fourth electric generator is electrically coupled to the fourth electric fan assembly for driving the fourth electric fan assembly. For example, with such an exemplary embodiment, the first propulsion system, second propulsion system, third propulsion system, and fourth propulsion system may each be in electrical communication with one another.

In certain exemplary embodiments the first turbomachine and the first primary fan are configured as part of a first turbofan engine, and the second turbomachine and the second primary fan are configured as part of a second turbofan engine.

In certain exemplary embodiments the first electric fan assembly includes a ducted electric fan, and the second electric fan assembly includes a ducted electric fan.

In certain exemplary embodiments the first electric fan assembly includes an un-ducted electric fan, and the second electric fan assembly includes an un-ducted electric fan.

In yet another exemplary aspect of the present disclosure, a propulsion system for an aircraft is provided. The propulsion system includes a turbomachine, a primary fan mechanically driven by the turbomachine, an electric generator mechanically driven by the turbomachine, and an electric fan assembly including a plurality of electric fans. The electric generator is electrically connected to each of the plurality of electric fans of the electric fan assembly for powering each of the plurality of electric fans of the electric fan assembly.

In certain exemplary embodiments the plurality of electric fans includes at least three electric fans.

In certain exemplary embodiments the turbomachine includes a first turbine, the primary fan is mechanically driven by the first turbine of the turbomachine, and the electric generator is also mechanically driven by the first turbine of the turbomachine.

In certain exemplary embodiments the turbomachine and the primary fan are configured as part of a turbofan engine.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which:

FIG. 7 is a top view of an aircraft including a propulsion system according to still another exemplary embodiment of the present disclosure.

DETAILED DESCRIPTION

Figure 1:
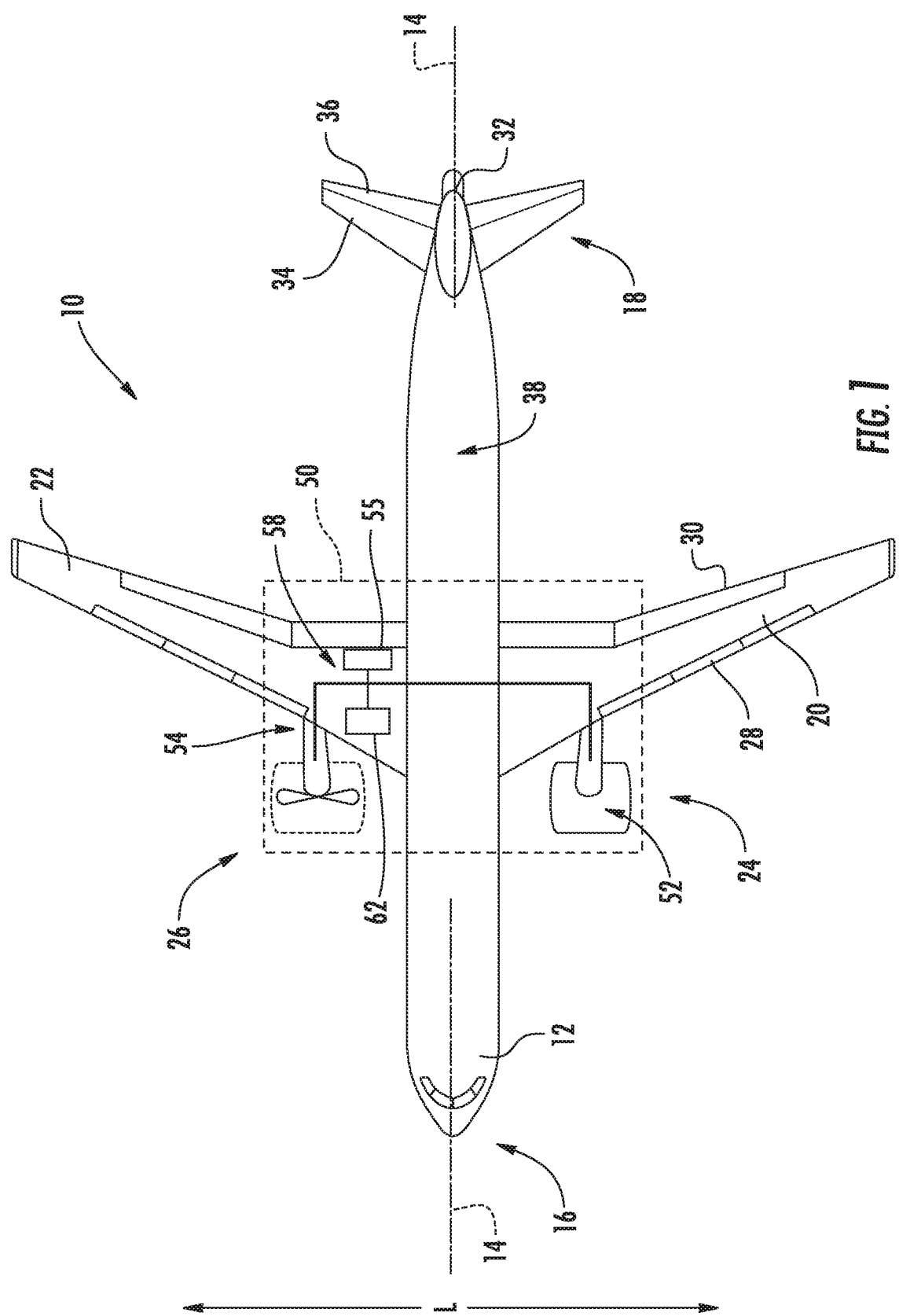
FIG. 1 is a top view of an aircraft according to various exemplary embodiments of the present disclosure.

Reference will now be made in detail to present embodiments of the invention, one or more examples of which are illustrated in the accompanying drawings. The detailed description uses numerical and letter designations to refer to features in the drawings. Like or similar designations in the drawings and description have been used to refer to like or similar parts of the invention.

As used herein, the terms "first", "second", "third", etc. may be used interchangeably to distinguish one component from another and are not intended to signify location or importance of the individual components.

The singular forms "a", "an", and "the" include plural references unless the context clearly dictates otherwise.

Approximating language, as used herein throughout the specification and claims, is applied to modify any quantitative representation that could permissibly vary without resulting in a change in the basic function to which it is related. Accordingly, a value modified by a term or terms, such as "about", "approximately", and "substantially", are not to be limited to the precise value specified. In at least some instances, the approximating language may correspond to the precision of an instrument for measuring the value, or the precision of the methods or machines for constructing or manufacturing the components and/or systems. For example, the approximating language may refer to being within a 10% margin. Here and throughout the specification and claims, range limitations are combined and interchanged, such ranges are identified and include all the sub-ranges contained therein unless context or language indicates otherwise.

As used herein, the terms "processor" and "computer," and related terms, e.g., "processing device," "computing device," and "controller", are not limited to just those integrated circuits referred to in the art as a computer, but further broadly refers to one or more processing devices including one or more of a microcontroller, a microcomputer, a programmable logic controller (PLC), an application specific integrated circuit, and other programmable circuits, and these terms are used interchangeably herein. In the embodiments described herein, the computer or controller may additionally include memory. The memory may include, but is not limited to, a computer-readable medium, such as a random access memory (RAM), a computer-readable non-volatile medium, such as a flash memory. Alternatively, a floppy disk, a compact disc-read only memory (CD-ROM), a magneto-optical disk (MOD), and/or a digital versatile disc (DVD) may also be used. Also, in the embodiments described herein, the computer or controller may include one or more input channels and/or one or more output channels. The input channels may be, but are not limited to, computer peripherals associated with an operator interface such as a mouse and a keyboard, or sensors, such as engine sensors associated with an engine, such as a gas turbine engine, for determining operating parameters of the engine. Furthermore, in the exemplary embodiment, the output channels may include, but are not be limited to, an operator interface monitor. Further, the memory may store software or other instructions, which when executed by the controller or processor allow the controller to perform certain operations or functions. The term "software" may include any computer program stored in memory, or accessible by the memory, for execution by, e.g., the controller, processor, clients, and servers.

Referring now to the drawings, wherein identical numerals indicate the same elements throughout the figures, FIG. 1 provides a top view of an exemplary aircraft 10 as may incorporate various embodiments of the present disclosure. As shown in FIG. 1, the aircraft 10 defines a longitudinal centerline 14 that extends therethrough, a lateral direction L, a forward end 16, and an aft end 18. Moreover, the aircraft 10 includes a fuselage 12, extending longitudinally from the forward end 16 of the aircraft 10 to the aft end 18 of the aircraft 10, and a wing assembly including a port side and a starboard side. More specifically, the port side of the wing assembly is a first, port side wing 20, and the starboard side of the wing assembly is a second, starboard side wing 22. The first and second wings 20, 22 each extend laterally outward with respect to the longitudinal centerline 14. The first wing 20 and a portion of the fuselage 12 together define a first side 24 of the aircraft 10, and the second wing 22 and another portion of the fuselage 12 together define a second side 26 of the aircraft 10. For the embodiment depicted, the first side 24 of the aircraft 10 is configured as the port side of the aircraft 10, and the second side 26 of the aircraft 10 is configured as the starboard side of the aircraft 10.

Each of the wings 20, 22 for the exemplary embodiment depicted includes one or more leading edge flaps 28 and one or more trailing edge flaps 30. The aircraft 10 further includes a vertical stabilizer 32 having a rudder flap (not shown) for yaw control, and a pair of horizontal stabilizers 34, each having an elevator flap 36 for pitch control. The fuselage 12 additionally includes an outer surface or skin 38. It should be appreciated however, that in other exemplary embodiments of the present disclosure, the aircraft 10 may additionally or alternatively include any other suitable configuration. For example, in other embodiments, the aircraft 10 may include any other configuration of stabilizer.

Figure 2:
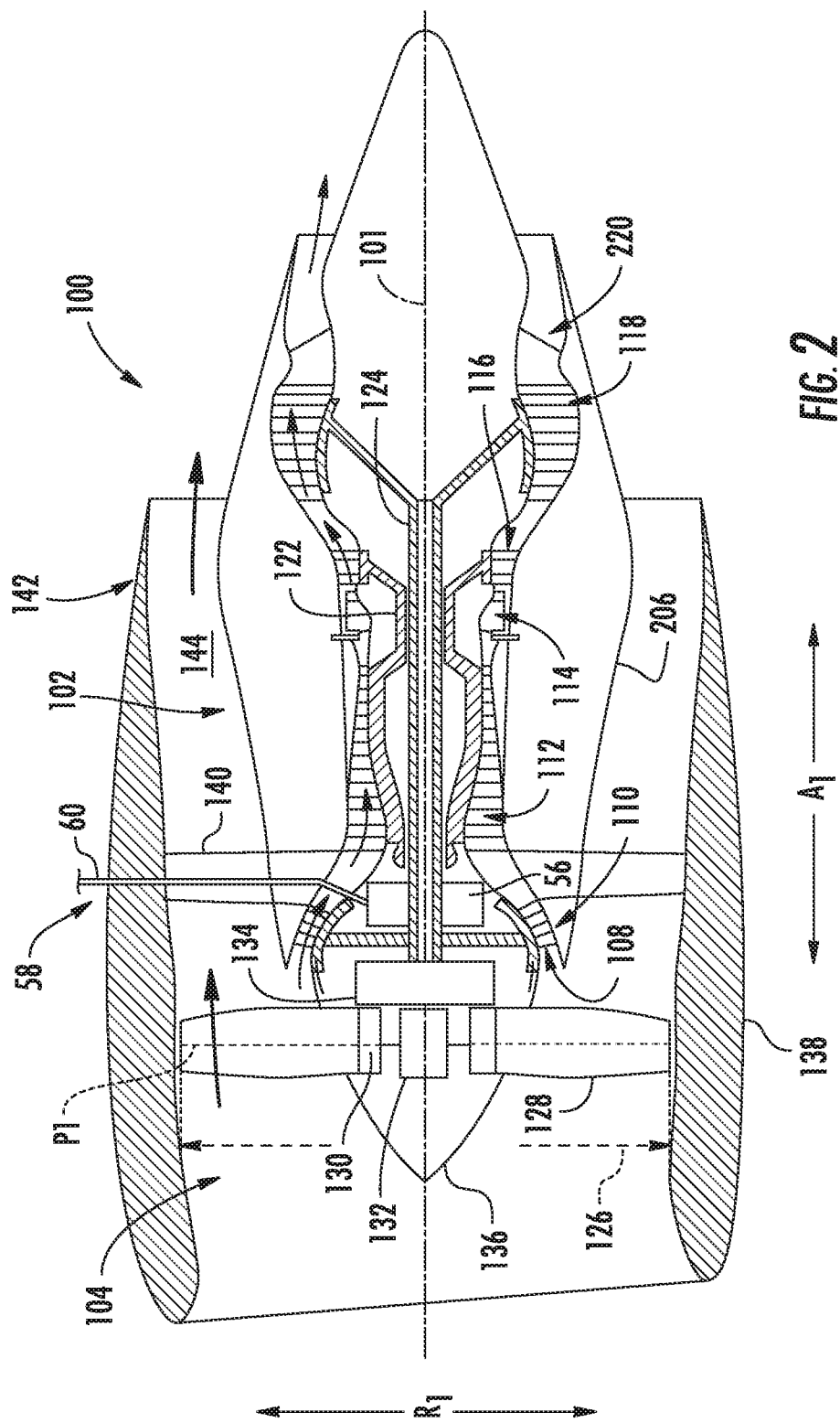
FIG. 2 is a schematic, cross-sectional view of a gas turbine engine in accordance with an exemplary embodiment of the present disclosure, which may be mounted to the exemplary aircraft of FIG. 1.
Figure 3:
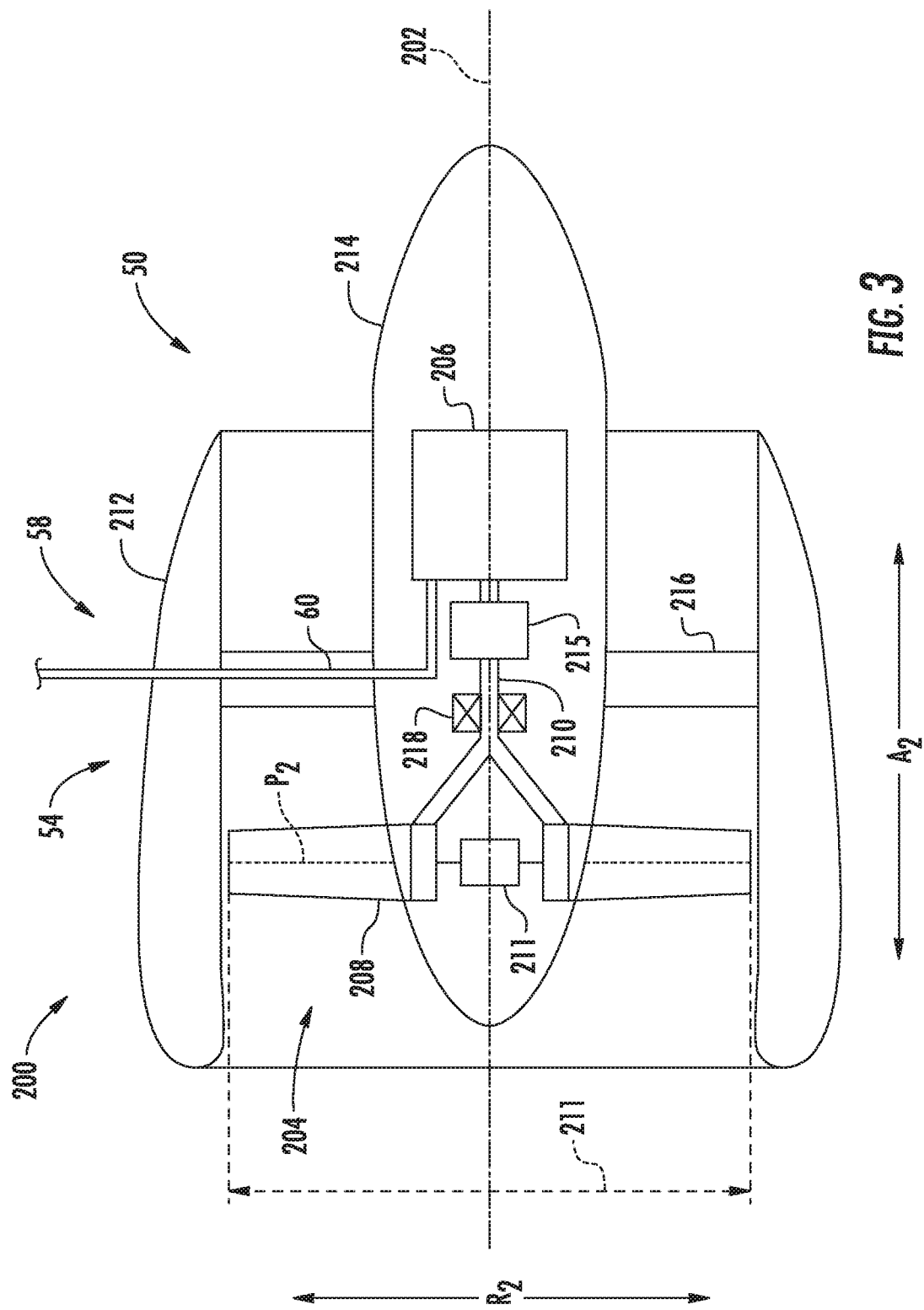
FIG. 3 is a schematic, cross-sectional view of an electric fan assembly in accordance with an exemplary embodiment of the present disclosure, which may be mounted to the exemplary aircraft of FIG. 1.

Referring now also to FIGS. 2 and 3, the exemplary aircraft 10 of FIG. 1 additionally includes a propulsion system 50 having a first propulsor assembly 52 and a second propulsor assembly 54. FIG. 2 provides a schematic, cross-sectional view of the first propulsor assembly 52, and FIG. 3 provides a schematic, cross-sectional view of the second propulsor assembly 54. As is depicted, each of the first propulsor assembly 52 and second propulsor assembly 54 are configured as under-wing mounted propulsor assemblies.

Referring particularly to FIGS. 1 and 2, the first propulsor assembly 52 is mounted, or configured to be mounted, to the first side 24 of the aircraft 10, or more particularly, to the first wing 20 of the aircraft 10. The first propulsor assembly 52 generally includes a turbomachine 102 and a primary fan (referred to simply as "fan 104" with reference to FIG. 2). More specifically, for the embodiment depicted the first propulsor assembly 52 is configured as a turbofan engine 100 (i.e., the turbomachine 102 and the fan 104 are configured as part of the turbofan 100).

As shown in FIG. 2, the turbofan 100 defines an axial direction A1 (extending parallel to a longitudinal centerline 101 provided for reference) and a radial direction R1. As stated, the turbofan 100 includes the fan 104 and the turbomachine 102 disposed downstream from the fan 104.

The exemplary turbomachine 102 depicted generally includes a substantially tubular outer casing 106 that defines an annular inlet 108. The outer casing 106 encases, in serial flow relationship, a compressor section including a booster or low pressure (LP) compressor 110 and a high pressure (HP) compressor 112; a combustion section 114; a turbine section including a first, low pressure (LP) turbine 118 and a second, high pressure (HP) turbine 116; and a jet exhaust nozzle section 120.

The exemplary turbomachine 102 of the turbofan 100 additionally includes one or more shafts rotatable with at least a portion of the turbine section and, for the embodiment depicted, at least a portion of the compressor section. More particularly, for the embodiment depicted, the turbofan 100 includes a high pressure (HP) shaft or spool 122, which drivingly connects the HP turbine 116 to the HP compressor 112. Additionally, the exemplary turbofan 100 includes a low pressure (LP) shaft or spool 124, which drivingly connects the LP turbine 118 to the LP compressor 110.

Further, the exemplary fan 104 depicted is configured as a variable pitch fan having a plurality of fan blades 128 coupled to a disk 130 in a spaced apart manner. As will be appreciated, the fan 104 includes a total number (i.e., count) of fan blades 128 and defines a fan diameter 126. The fan diameter 126 refers to a measurement twice as long as a radius of a fan blade 128, the radius of a fan blade 128 being a measurement from a tip of a fan blade 128 to the longitudinal centerline axis 101 along the radial direction R1.

The fan blades 128 extend outwardly from disk 130 generally along the radial direction R1. Each fan blade 128 is rotatable relative to the disk 130 about a respective pitch axis P1 by virtue of the fan blades 128 being operatively coupled to a suitable actuation member 132 configured to collectively vary the pitch of the fan blades 128. The fan 104 is mechanically coupled to the LP shaft 124, such that the fan 104 is mechanically driven by the first, LP turbine 118. More particularly, the fan 104, including the fan blades 128, disk 130, and actuation member 132, is mechanically coupled to the LP shaft 124 through a power gearbox 134, and is rotatable about the longitudinal axis 101 by the LP shaft 124 across the power gear box 134. The power gear box 134 includes a plurality of gears for stepping down the rotational speed of the LP shaft 124 to a more efficient rotational fan speed. Accordingly, the fan 104 is powered by an LP system (including the LP turbine 118) of the turbomachine 102.

Referring still to the exemplary embodiment of FIG. 2, the disk 130 is covered by rotatable front hub 136 aerodynamically contoured to promote an airflow through the plurality of fan blades 128. Additionally, the turbofan 100 includes an annular fan casing or outer nacelle 138 that circumferentially surrounds the fan 104 and/or at least a portion of the turbomachine 102. Accordingly, the exemplary turbofan 100 depicted may be referred to as a "ducted" turbofan engine. Moreover, the nacelle 138 is supported relative to the turbomachine 102 by a plurality of circumferentially-spaced outlet guide vanes 140. A downstream section 142 of the nacelle 138 extends over an outer portion of the turbomachine 102 so as to define a bypass airflow passage 144 therebetween.

Referring still to FIG. 2, the propulsion system 50 additionally includes an electric machine, which for the embodiment depicted is configured as an electric generator 56. The electric generator 56 is, for the embodiment depicted, positioned within the turbomachine 102 of the turbofan engine 100 and is in mechanical communication with one of the shafts of the turbofan engine 100. More specifically, for the embodiment depicted, the electric generator is driven by the first, LP turbine 118 through the LP shaft 124. The electric generator 56 is configured to convert mechanical power of the LP shaft 124 to electric power. Accordingly, the electric generator 56 is also powered by the LP system (including the LP turbine 118) of the turbomachine 102.

It should be appreciated, however, that in other exemplary embodiments, the electric generator 56 may instead be positioned at any other suitable location within the turbomachine 102 or elsewhere, and may be, e.g., powered in any other suitable manner. For example, the electric generator 56 may be, in other embodiments, mounted coaxially with the LP shaft 124 within the turbine section, or alternatively may be offset from the LP shaft 124 and driven through a suitable gear train. Additionally, or alternatively, in other exemplary embodiments, the electric generator 56 may instead be powered by the HP system, i.e., by the HP turbine 116 through the HP shaft 122, or by both the LP system (e.g., the LP shaft 124) and the HP system (e.g., the HP shaft 122) via a dual drive system.

It should further be appreciated that the exemplary turbofan engine 100 depicted in FIG. 2 may, in other exemplary embodiments, have any other suitable configuration. For example, in other exemplary embodiments, the fan 104 may not be a variable pitch fan, and further, in other exemplary embodiments, the LP shaft 124 may be directly mechanically coupled to the fan 104 (i.e., the turbofan engine 100 may not include the gearbox 134). Further, it should be appreciated, that in other exemplary embodiments, the turbofan engine 100 may instead be configured as any other suitable aircraft engine including a turbomachine mechanically coupled to a primary fan. For example, in other embodiments, the turbofan engine 100 may instead be configured as a turboprop engine (i.e., the primary fan may be configured as a propeller), an unducted turbofan engine (i.e., the gas turbine engine may not include the outer nacelle 138), etc.

Referring still to FIGS. 1 and 2, the propulsion system 50 depicted additionally includes an electrical power bus 58 to allow the electric generator 56 to be in electrical communication with one or more other components of the propulsion system 50 and/or the aircraft 10. For the embodiment depicted, the electrical power bus 58 includes one or more electrical lines 60 connected to the electric generator 56, and for the embodiment depicted, extending through one or more of the outlet guide vanes 140. Additionally, the propulsion system 50 depicted further includes one or more energy storage devices 55 (such as one or more batteries or other electrical energy storage devices) electrically connected to the electrical power bus 58 for, e.g., providing electrical power to the electric fan assembly 54 and/or receiving electrical power from the electric generator 56. In certain exemplary embodiments, the one or more energy storage devices 55 may be positioned proximate the electric fan assembly 54 for weight distribution purposes. Inclusion of the one or more energy storage devices 55 may provide performance gains, and may increase a propulsion capability of the propulsion system 50 during, e.g., transient operations. More specifically, the propulsion system 50 including one or more energy storage devices 55 may be capable of responding more rapidly to speed change demands.

Referring now particularly to FIGS. 1 and 3, the exemplary propulsion system 50 additionally includes the second propulsor assembly 54 positioned, or configured to be positioned, at a location spaced apart from the first propulsor assembly 52 (including, e.g., the turbomachine and the primary fan). More specifically, for the embodiment depicted, the second propulsor assembly 54 is mounted at a location away from the first propulsor assembly 52 along the lateral direction L such that they ingest different airstreams along the lateral direction L. However, in other embodiments, the first and second propulsor assemblies 52, 54 may each be mounted to the aircraft 10 using a common mount. With such a configuration, however, the first and second propulsor assemblies 52, 54 may still be positioned on the mount in a manner such that they are spaced apart from one another, e.g., along the lateral direction L such that they ingest different airstreams along the lateral direction L.

Referring still to the exemplary embodiment of FIGS. 1 and 3, the second propulsor assembly 54 is mounted to the second side 26 of the aircraft 10, or rather to the second wing 22 of the aircraft 10. Referring particularly to FIG. 3, the second propulsor assembly 54 is generally configured as an electric fan assembly including an electric fan 200. The electric fan 200 defines an axial direction A2 extending along a longitudinal centerline axis 202 that extends therethrough for reference, as well as a radial direction R2. Additionally, the electric fan 200 generally includes a fan 204 and an electric machine, which for the embodiment depicted is configured as an electric motor 206. For the embodiment depicted, the fan 204 is rotatable about the centerline axis 202.

The fan 204 includes a plurality of fan blades 208 and a fan shaft 210. The plurality of fan blades 208 are attached to/rotatable with the fan shaft 210 and spaced generally along a circumferential direction of the electric fan 200 (not shown). More specifically, the fan 204 of the electric fan 200 generally includes a total number of fan blades 208 and defines a fan diameter 211. The fan diameter 211 refers to a measurement twice as long as a radius of a fan blade 208, the radius of a fan blade 208 being a measurement from a tip of a fan blade 208 to the longitudinal centerline axis 22 along the radial direction R2.

In certain exemplary embodiments, the plurality of fan blades 208 may be attached in a fixed manner to the fan shaft 210, or alternatively, the plurality of fan blades 208 may be rotatable relative to the fan shaft 210, such as in the embodiment depicted. For example, the plurality of fan blades 208 each define a respective pitch axis P2, and for the embodiment depicted are attached to the fan shaft 210 such that a pitch of each of the plurality of fan blades 208 may be changed, e.g., in unison, by a pitch change mechanism 211. Changing the pitch of the plurality of fan blades 208 may increase an efficiency of the second propulsor assembly 54 and/or may allow the second propulsor assembly 54 to achieve a desired thrust profile. With such an exemplary embodiment, the fan 204 may be referred to as a variable pitch fan.

Moreover, for the embodiment depicted, the electric fan 200 depicted additionally includes a fan casing or outer nacelle 212, attached to a core 214 of the electric fan 200 through one or more struts or outlet guide vanes 216. For the embodiment depicted, the outer nacelle 212 substantially completely surrounds the fan 204, and particularly the plurality of fan blades 208. Accordingly, for the embodiment depicted, the electric fan 200 may be referred to as a ducted electric fan.

Referring still particularly to FIG. 3, the fan shaft 210 is mechanically coupled to the electric motor 206 within the core 214, such that the electric motor 206 drives the fan 204 through the fan shaft 210. For the embodiment depicted, the electric motor 206 is configured as a variable speed electric motor, such that the electric motor 206 may drive the fan 204 at various rotational speeds despite an amount of power provided thereto. Additionally, for the embodiment depicted, the electric fan 200 additionally includes a gearbox 215 allowing for the rotational speed of the fan shaft 210 to be further increased or decreased relative to a rotational speed of the electric motor 206. Accordingly, for the embodiment depicted, the electric motor 206 further drives the fan 204 across the gearbox 215 and through the fan shaft 210.

The fan shaft 210 is supported by one or more bearings 218, such as the one or more roller bearings, ball bearings, or any other suitable bearings. Additionally, the electric motor 206 may be an inrunner electric motor (i.e., including a rotor positioned radially inward of a stator), or alternatively may be an outrunner electric motor (i.e., including a stator positioned radially inward of a rotor). As briefly noted above, the electric generator 56 of the propulsion system 50 is in electrical communication with the electric fan 200 for powering the electric fan 200. More particularly, the electric motor 206 of the electric fan 200 is in electrical communication with the electrical power bus 58, which for the embodiment depicted includes one or more electrical lines 60 electrically connected to the electric motor 206. Accordingly, the electric motor 206 is more particularly in electrical communication with the electrical power bus 58 through one or more electrical lines 60 of the electrical power bus 58, and the electrical power bus 58 may deliver power to the electric motor 206 for driving the electric motor 206, and in turn driving the fan 204.

Referring again briefly to FIG. 1, the propulsion system 50 depicted, or rather, the electric power bus 58 depicted, additionally includes an electric controller 62. The exemplary electric generator 56 depicted is in electrical communication with the electric fan 200 through the electric controller 62 of the electric power bus 58. The electric controller 62 may be operably connected to one or more additional controllers of the aircraft, for controlling an amount of power provided to the electric fan assembly.

Additionally, it should be appreciated that in certain exemplary embodiments, the fan 204 of the electric fan 200 may be different than the fan 104 of the turbofan engine 100. More specifically, at least one of the fan diameter 126 or the total number of fan blades 128 of the fan 104 of the turbofan engine 100 may be different than the fan diameter 211 or total number of fan blades 208 of the fan 204 of the electric fan 200 of the electric fan assembly. Additionally, or alternatively, in other exemplary embodiments, the fan 104 of the turbofan engine may define a fan pressure ratio distinct from a fan pressure ratio of the fan 204 the electric fan 200 during operation of the respective fans at a rated speed. As used herein, the term "fan pressure ratio" refers to a ratio of an air pressure immediately downstream of a fan to an air pressure immediately upstream of the respective fan. Additionally, used herein, the term "rated speed", with reference to the electric fan 200 and turbofan engine 100, refers to a maximum rotational speed that the electric fan 200 and turbofan engine 100 may achieve while operating properly. For example, the electric fan 200 and turbofan engine 100 may be operating at their respective rated speed during maximum load operations, such as during takeoff operations.

A propulsion system in accordance with one or more of the above embodiments may be referred to as a gas-electric, or hybrid propulsion system, given that a first propulsor assembly is configured as a turbofan engine mounted to a first side of an aircraft and a second propulsor assembly is configured as an electrically driven fan mounted to a second side of the aircraft. Such a configuration may allow for a single, relatively large engine to power two or more propulsors (which may be configured as, e.g., fans, propellers, etc.). Accordingly, a propulsion system in accordance with one or more embodiments of the present disclosure may allow for inclusion of a relatively large engine, which may in turn allow for an engine having increased efficiencies (as compared to relatively small engines).

It should be appreciated, however, that in other embodiments, the electric fan assembly may include an electric fan 200 having any other suitable configuration. For example, referring now to FIG. 4, an electric fan 200 of an electric fan assembly in accordance with another exemplary embodiment of the present disclosure is depicted. The exemplary electric fan 200 of FIG. 4 may be configured in substantially the same manner as the exemplary electric fan 200 of FIG. 3, and accordingly, the same or similar numbers may refer to the same or similar part.

Figure 4:
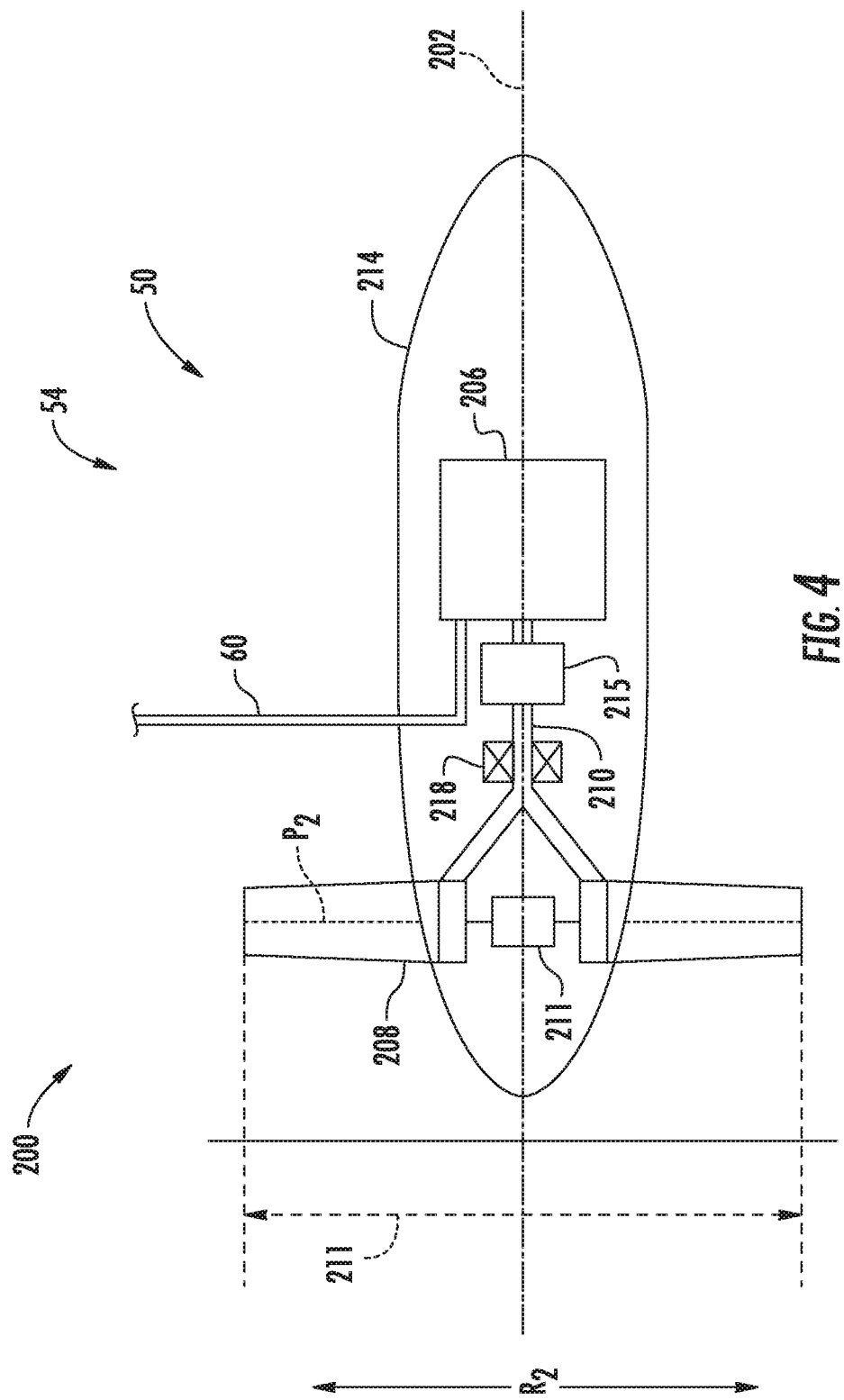
FIG. 4 is a schematic, cross-sectional view of an electric fan assembly in accordance with another exemplary embodiment of the present disclosure.

For example, the exemplary electric fan 200 of FIG. 4 generally includes a fan 204 including a plurality of fan blades 208 spaced generally along a circumferential direction of the electric fan 200 (not shown). Additionally, the plurality of fan blades 208 are attached to a fan shaft 210, with the fan shaft 210 supported by a one or more bearings 218. However, for the embodiment depicted, the electric fan 200 is configured without an outer nacelle 212 (i.e., configured as an un-ducted electric fan). Accordingly, it should be appreciated that in certain exemplary embodiments, the electric fan assembly may include an un-ducted electric fan.

Additionally, in still other embodiments, the exemplary propulsion system may be integrated into an aircraft 10 in any other suitable manner. For example, referring now to FIG. 5, an aircraft 10 and propulsion system 50 in accordance with another exemplary embodiment of the present disclosure is depicted. The exemplary aircraft 10 and propulsion system 50 of FIG. 5 may be configured in substantially the same manner as exemplary aircraft 10 and propulsion system 50 of FIGS. 1 through 3, and accordingly, the same or similar numbers may refer to same or similar parts.

Figure 5:
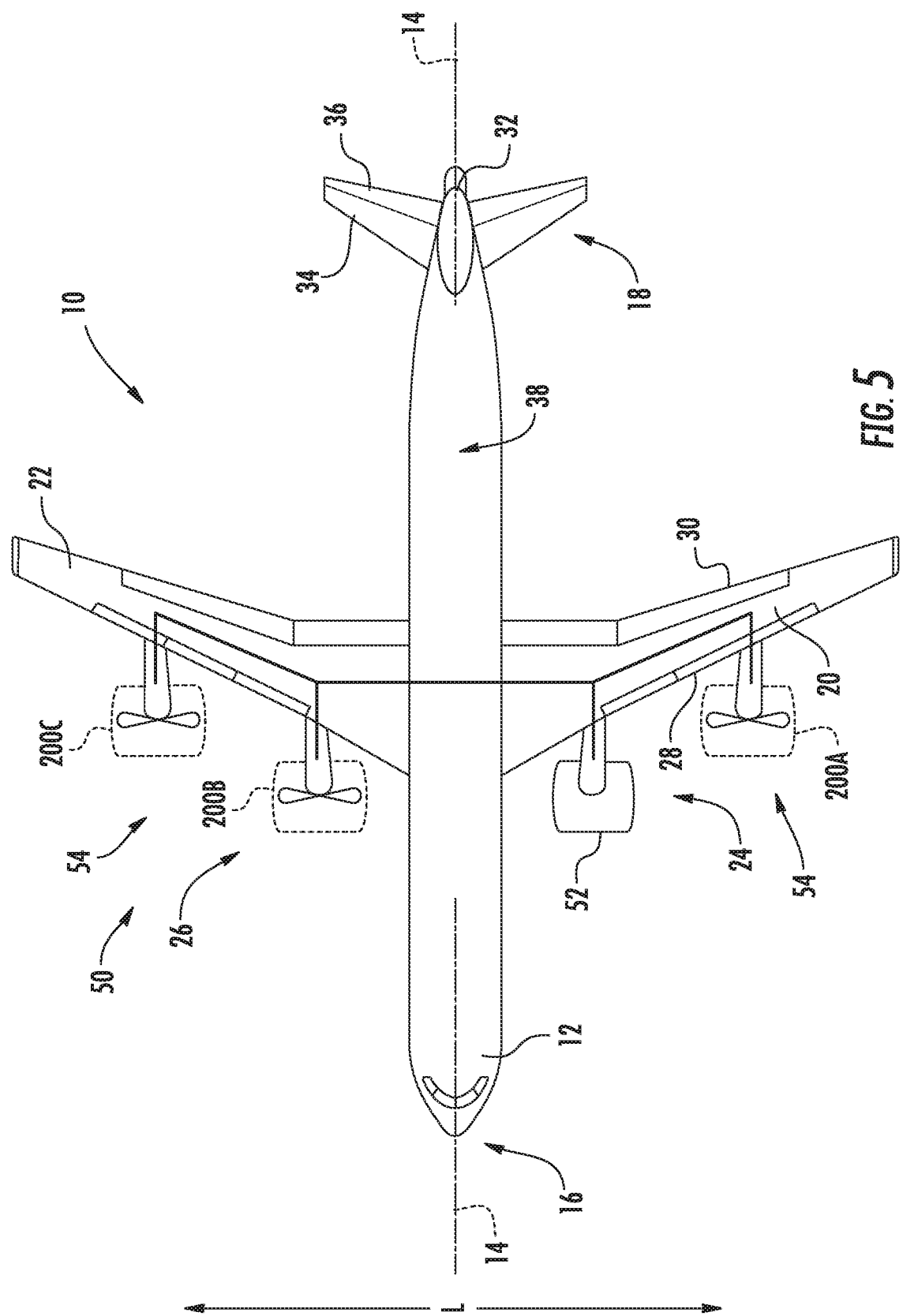
FIG. 5 is a top view of an aircraft including a propulsion system according to another exemplary embodiment of the present disclosure.

For example, the exemplary aircraft 10 of FIG. 5 generally includes a fuselage 12 and a wing assembly, the wing assembly including a port side wing 20 and a starboard side wing 22. Additionally, the propulsion system 50 includes a first propulsion system 52 including a turbomachine and a fan, the turbomachine and fan configured, e.g., as part of a turbofan engine. The propulsion system 50 additionally includes an electric generator 56 mechanically driven by the turbomachine (see FIG. 2). Moreover, the propulsion system 50 includes a second propulsion assembly 54, which is an electric fan assembly. The electric generator 56 is electrically connected to the electric fan assembly for powering the electric fan assembly.

Notably, however, for the embodiment of FIG. 5, the electric fan assembly includes a plurality of electric fans 200, with the electric generator 56 electrically connected to each of the plurality of electric fans 200 for powering each of the plurality of electric fans 200. More specifically, the electric fan assembly of FIG. 5 includes a first electric fan 200A mounted to the port side wing 20 of the aircraft 10 at a location laterally outward of the fuselage 12 relative to the turbofan engine 100. The electric fan assembly of FIG. 5 further includes a second electric fan 200B mounted to the starboard side wing 22 and a third electric fan 200C also mounted to the starboard side wing 22. The second and third electric fans 200B, 200C are spaced along the lateral direction L of the aircraft 10. Accordingly, for the exemplary embodiment of FIG. 5, the electric fan assembly includes a plurality of electric fans 200, the plurality of electric fans 200 including at least two electric fans 200, and more specifically for the embodiment depicted, at least three electric fans 200. Notably, however, in other exemplary embodiments, the electric fan assembly may include any other suitable number of electric fans 200. For example, in other exemplary embodiments the electric fan assembly may include two electric fans 200, four electric fans 200, or any other suitable number of electric fans 200. Additionally, the plurality of electric fans 200 may be arranged in any other suitable manner, and attached to the aircraft 10 at any suitable location (including tail mounted configurations).

Furthermore, it should be appreciated that in still other exemplary embodiments, the propulsion system 50 described above with reference to FIGS. 1 through 3 make be configured in still other exemplary manners. For example, referring now to FIG. 6, the exemplary aircraft 10 is depicted generally including a fuselage 12 and a wing assembly, the wing assembly including a port side wing 20 and a starboard side wing 22.

Figure 6:
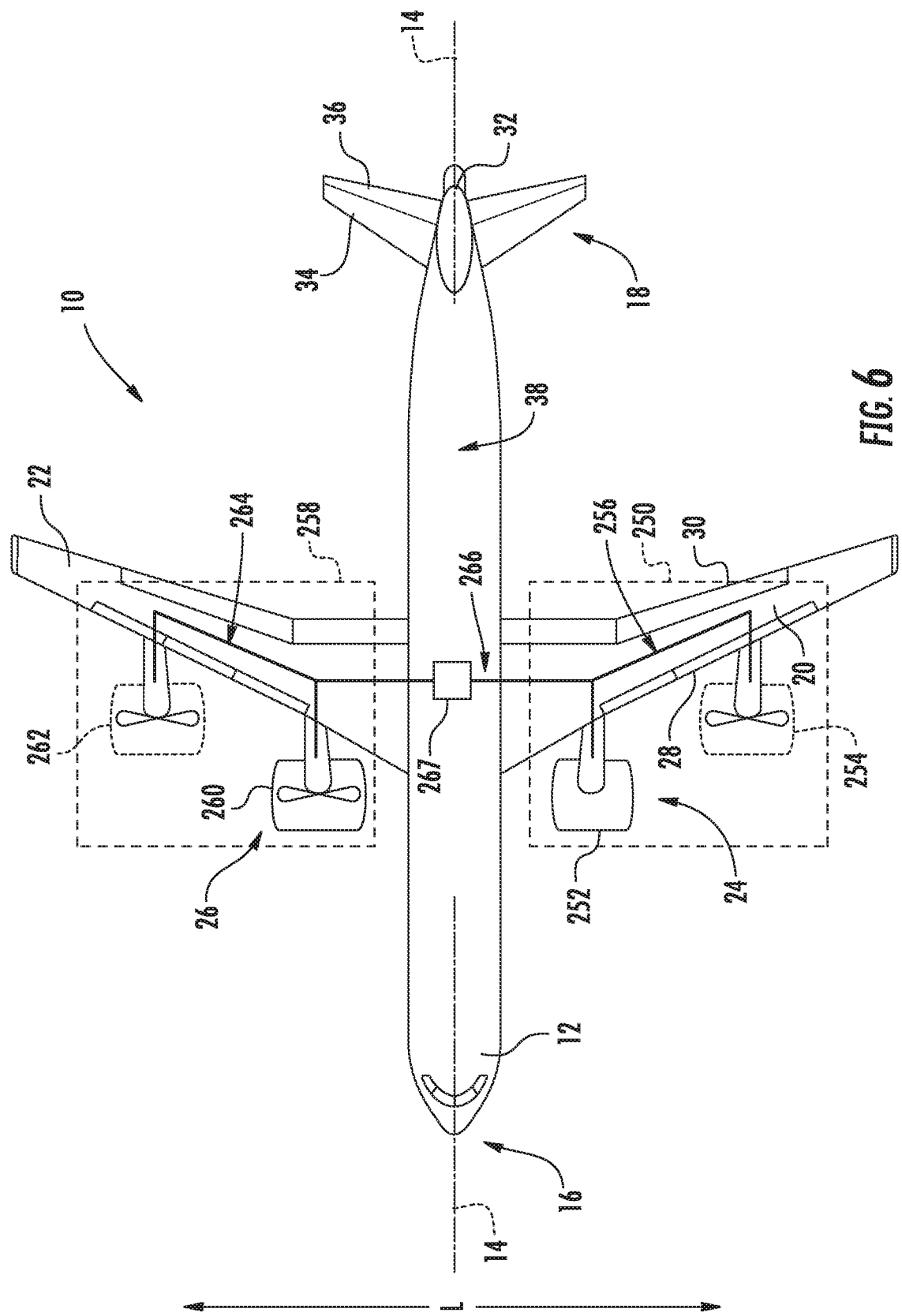
FIG. 6 is a top view of an aircraft including a propulsion system according to yet another exemplary embodiment of the present disclosure.

Additionally, the exemplary aircraft 10 of FIG. 6 includes a first propulsion system 250 in accordance with an exemplary embodiment of the present disclosure. The first propulsion system 250 may be configured in substantially the same manner as exemplary propulsion system 50 described above with reference to one or more of FIGS. 1 through 5. For example, the first propulsion system 250 may include a first gas turbine engine 252, a first electric generator (not shown), and a first electric fan assembly 254. The first gas turbine engine 252 of the first propulsion system 250 may be drivingly connected to the first electric generator and the first electric generator may be electrically coupled to the first electric fan assembly 254 through a first electrical power bus 256 for driving the electric fan assembly 254. The first gas turbine engine 252 of the first propulsion system 250 may generally include a first primary fan and a first turbomachine. For example, the first gas turbine engine 252 may be configured as a first turbofan engine (see FIG. 2).

However, for the embodiment depicted, the aircraft 10 further includes a second propulsion system 258. The second propulsion system 258 may also be configured in substantially the same manner as exemplary propulsion system 50 described above with reference to one or more of FIGS. 1 through 5. Specifically, the second propulsion system 258 includes a second gas turbine engine 260, a second electric generator (not shown), and a second electric fan assembly 262. The gas turbine engine 260 of the second propulsion system 258 is drivingly connected to the second electric generator and the second electric generator is electrically coupled to the second electric fan assembly 262 through a second electrical power bus 264 for driving the second electric fan assembly 262. The second gas turbine engine 260 of the second propulsion system 258 may generally include a second primary fan and a second turbomachine. For example, the second gas turbine engine 260 may be configured as a second turbofan engine (see FIG. 2).

Notably, although for the embodiment of FIG. 6, the first electric fan assembly 254 is depicted including a first ducted electric fan and the second electric fan assembly 262 is depicted including a second ducted electric fan, in other exemplary embodiments one or both of the first or second electric fan assemblies 254, 262 may include one or more un-ducted electric fans (see FIG. 4). Additionally, although the first and second fan assemblies 254, 262 are depicted including a single electric fan, in other exemplary embodiments, one or both of the first or second fan assemblies 254, 262 may include a plurality of the electric fans (see FIG. 5).

Referring still to the embodiment depicted in FIG. 6, the first gas turbine engine 252 of the first propulsion system 250 is mounted to the port side wing 20 and drives the second electric fan assembly 254 also mounted to the port side wing 20. Additionally, the second gas turbine engine 260 of the second propulsion system 258 is mounted to the starboard side wing 22 and drives the second electric fan assembly 262 also mounted to the starboard side wing 22. Moreover, as is also depicted in FIG. 6, the first propulsion system 250 is in electrical communication with the second propulsion system 258. More specifically, the first power bus 256 of the first propulsion system 250 is in electrical communication with the second bus 264 of the second propulsion system 258 through an intermediate power bus 266. The intermediate power bus 266, for the embodiment depicted, includes a controller 267 capable of distributing power from one propulsion system to another. Such a configuration may allow for one of the propulsion systems to power the electric fan assembly of the other propulsion system in the event of a failure of, e.g., the turbomachine of such propulsion system.

For example, in certain exemplary aspects of the present disclosure, the controller 267 may detect a failure of a turbomachine of one of the plurality of propulsion systems, and in response, direct a portion of the electric power generated by the remaining propulsion systems to the electric fan assembly of the propulsion system including the failed turbomachine. Referring particularly to the exemplary aspect of FIG. 6, in certain exemplary aspects of the present disclosure the controller 267 may detect a failure of a turbomachine of the first propulsion system, and in response, direct a portion of the electric power generated by the second propulsion system to the electric fan assembly of the first propulsion system.

Furthermore, still, it should be appreciated that in yet other exemplary embodiments, the propulsion system 50 described above with reference to FIGS. 1 through 3 may be configured in still other exemplary manners. For example, referring now to FIG. 7, an exemplary aircraft 10 is depicted generally including a fuselage 12 and a wing assembly, the wing assembly including a port side wing 20 and a starboard side wing 22.

Similar to the exemplary embodiment of FIG. 6, the aircraft 10 includes a first propulsion system 250 and a second propulsion system 258. The first propulsion system 250 includes a first turbomachine and a first primary fan (which for the embodiment depicted are configured together as a first turbofan engine 252), a first electric generator (not shown), and a first electric fan assembly 254. The first turbomachine is drivingly connected to the first primary fan and the first electric generator. The first electric generator is electrically coupled to the first electric fan assembly 254 for driving the first electric fan assembly 254. The second propulsion system 258 similarly includes a second turbomachine and a second primary fan (which for the embodiment depicted are configured together as a second turbofan engine 260), a second electric generator (not shown), and a second electric fan assembly 262. The second turbomachine is drivingly connected to the second primary fan and the second electric generator. The second electric generator is electrically coupled to the second electric fan assembly 262 for driving the second electric fan assembly 262.

However, for the embodiment of FIG. 6, the aircraft 10 further includes a third propulsion system 268 and a fourth propulsion system 270. The third and fourth propulsion systems 268, 270 are configured in a similar manner to the first and second propulsion systems 250, 258. For example, the third propulsion system 268 includes a third turbomachine and a third primary fan (which for the embodiment depicted are configured together as a third turbofan engine 272), a third electric generator (not shown), and a third electric fan assembly 274. The third turbomachine is drivingly connected to the third primary fan and the third electric generator. The third electric generator is electrically coupled to the third electric fan assembly 274 for driving the third electric fan assembly 274. The fourth propulsion system 270 similarly includes a fourth turbomachine and a fourth primary fan (which for the embodiment depicted are configured together as a fourth turbofan engine 276), a fourth electric generator (not shown), and a fourth electric fan assembly 276. The fourth turbomachine is drivingly connected to the fourth primary fan and the fourth electric generator. The fourth electric generator is electrically coupled to the fourth electric fan assembly 276 for driving the fourth electric fan assembly 276.

Moreover, for the embodiment depicted, the first propulsion system 250, second propulsion system 258, third propulsion system 268, and fourth propulsion system 270 are each in electrical communication with one another through an intermediate power bus 266. As with the embodiment of FIG. 5, the intermediate power bus 266 includes a controller 267 for distributing electrical power from one or more of the propulsion systems to the remaining propulsion systems.

It should be appreciated, however, that in other exemplary aspects of the present disclosure an aircraft may instead include any other suitable number of propulsion systems configured in any other suitable manner. For example, in other exemplary embodiments of the present disclosure, the aircraft may include three propulsion systems, five propulsion systems, etc., one or more of which including turbomachines and/or electric fans mounted to the wings, at a tail section of the aircraft, or at any other suitable location.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. An aircraft having propulsion system and a wing assembly, the aircraft comprising:
   a turbomachine comprising a first turbine;
   a primary fan mechanically driven by the first turbine of the turbomachine;
   an electric generator mechanically driven by the first turbine of the turbomachine; and
   an electric fan assembly, the electric generator electrically connected to the electric fan assembly for powering the electric fan assembly, the electric fan assembly including at least one blade disposed longitudinally-forward of the wing assembly and longitudinally-rearward of at least one blade of the primary fan;
   wherein the turbomachine and primary fan are an under-wing mounted engine mounted to the wing assembly, and wherein the electric fan assembly is an under-wing mounted electric fan assembly mounted to the wing assembly at one or more locations spaced apart from the turbomachine and primary fan.

2. The aircraft of claim 1, wherein the electric fan assembly comprises a plurality of electric fans, wherein the electric generator is electrically connected to each of the plurality of electric fans for powering each of the plurality of electric fans, and wherein each of the plurality of electric fans are under-wing mounted electric fans.

3. The aircraft of claim 2, wherein the plurality of electric fans includes at least three electric fans.

4. The aircraft of claim 1, wherein the primary fan defines a fan diameter and includes a number of fan blades, wherein the electric fan assembly includes an electric fan defining a fan diameter and including a number of fan blades, and wherein at least one of the fan diameter or the number of fan blades of the primary fan is different than the fan diameter or number of fan blades of the electric fan of the electric fan assembly.

5. The aircraft of claim 1, wherein the turbomachine and the primary fan are part of a turbofan engine.

6. The aircraft of claim 1, wherein the electric fan assembly comprises a ducted electric fan.

7. The aircraft of claim 1, wherein the electric fan assembly comprises an un-ducted electric fan.

8. The aircraft of claim 1, wherein the turbomachine and primary fan are a turbofan engine, wherein the turbofan engine is the sole turbofan engine of the propulsion system.

9. The aircraft of claim 1, wherein the aircraft includes a fuselage and the wing assembly comprises a first wing extending from the fuselage, wherein the turbomachine and primary fan are coupled to the first wing at a location closer to the fuselage of the aircraft than the first electric fan.

10. An aircraft comprising:
    a wing assembly;
    a first propulsion system comprising a first turbomachine, a first primary fan, a first electric generator, and a first electric fan assembly, the first turbomachine drivingly connected to the first primary fan and the first electric generator, and the first electric generator electrically coupled to the first electric fan assembly for driving the first electric fan assembly, wherein the first turbomachine and first primary fan are a first under-wing mounted engine mounted to the wing assembly, and wherein the first electric fan assembly is a first under-wing mounted electric fan assembly mounted to the wing assembly; and
    a second propulsion system comprising a second turbomachine, a second primary fan, a second electric generator, and a second electric fan assembly, the second turbomachine drivingly connected to the second primary fan and the second electric generator, and the second electric generator electrically coupled to the second electric fan assembly for driving the second electric fan assembly, wherein the first turbomachine and first primary fan are a first under-wing mounted engine mounted to the wing assembly, and wherein the second electric fan assembly is a second under-wing mounted electric fan assembly mounted to the wing assembly;
    wherein the first propulsion system is in electrical communication with the second propulsion system and each of the first and second electric fan assemblies extending at least partially longitudinally-forward of the wing assembly and longitudinally-rearward of each respective first and second turbomachine.

11. The aircraft of claim 10, further comprising:
    an electric power bus, wherein the first propulsion system is in electrical communication with the second propulsion system through the electric power bus.

12. The aircraft of claim 10, wherein the first electric fan assembly comprises a plurality of under-wing mounted electric fans mounted to the wing assembly, and wherein the second electric fan assembly also comprises a plurality of under-wing mounted electric fans mounted to the wing assembly.

13. The aircraft of claim 10, wherein the wing assembly comprises a first wing and a second wing, wherein the first propulsion system is mounted to the first wing, and wherein the second propulsion system is mounted to the second wing.

14. The aircraft of claim 10, further comprising:
    a third propulsion system comprising a third turbomachine, a third primary fan, a third electric generator, and a third electric fan assembly, the third turbomachine drivingly connected to the third primary fan and the third electric generator, and the third electric generator electrically coupled to the third electric fan assembly for driving the third electric fan assembly, wherein the third turbomachine and third primary fan are a third under-wing mounted engine mounted to the wing assembly, and wherein the third electric fan assembly is a third under-wing mounted electric fan assembly mounted to the wing assembly; and
    a fourth propulsion system comprising a fourth turbomachine, a fourth primary fan, a fourth electric generator, and a fourth electric fan assembly, the fourth turbomachine drivingly connected to the fourth primary fan and the fourth electric generator, and the fourth electric generator electrically coupled to the fourth electric fan assembly for driving the fourth electric fan assembly, wherein the fourth turbomachine and fourth primary fan are a fourth under-wing mounted engine mounted to the wing assembly, and wherein the fourth electric fan assembly is a fourth under-wing mounted electric fan assembly mounted to the wing assembly.

15. The aircraft of claim 14, wherein the first propulsion system, second propulsion system, third propulsion system, and fourth propulsion system are each in electrical communication with one another.

16. The aircraft of claim 10, wherein the first turbomachine and the first primary fan are part of a first turbofan engine, and wherein the second turbomachine and the second primary fan are part of a second turbofan engine.

17. An aircraft having a propulsion system, the aircraft comprising:
 a turbomachine;
 a primary fan mechanically driven by the turbomachine;
 an electric generator mechanically driven by the turbomachine; and
 an electric fan assembly comprising a plurality of electric fans, the electric generator electrically connected to each of the plurality of electric fans of the electric fan assembly for powering each of the plurality of electric fans of the electric fan assembly;
 wherein at least one of the plurality of electric fans is positioned at least partially longitudinally-forward of a wing of the aircraft and at least partially longitudinally-rearward of the primary fan, and wherein the turbomachine and primary fan are an under-wing mounted engine and each of the plurality of electric fans is an under-wing mounted electric fan.

18. The aircraft of claim 17, wherein the plurality of electric fans includes at least three electric fans and wherein a number of fans mounted to a first wing is different from a number of fans mounted to a second wing, the second wing positioned on an opposing side of a fuselage from the first wing.

19. The aircraft of claim 17, wherein the turbomachine comprises a first turbine, wherein the primary fan is mechanically driven by the first turbine of the turbomachine, and wherein the electric generator is also mechanically driven by the first turbine of the turbomachine.

20. The aircraft of claim 17, wherein the turbomachine and the primary fan are part of a turbofan engine.

* * * * *